United States Patent [19]

Metz

[11] 4,229,219
[45] Oct. 21, 1980

[54] INKS FOR INK JET PRINTING

[75] Inventor: Eric A. Metz, Gilroy, Calif.

[73] Assignee: International Business Machines Corporation, Armonk, N.Y.

[21] Appl. No.: 69,427

[22] Filed: Aug. 24, 1979

[51] Int. Cl.³ ............................................. C09D 11/02
[52] U.S. Cl. ................................... 106/22; 106/18.32
[58] Field of Search ............................ 106/18.32, 22

[56] References Cited

U.S. PATENT DOCUMENTS

| | | | |
|---|---|---|---|
| 1,893,997 | 1/1933 | Barksdale | 260/387 |
| 2,083,372 | 6/1937 | Guthmann | 134/29 |
| 2,755,202 | 7/1956 | Balon et al. | 117/36 |
| 3,291,580 | 12/1966 | Malick | 44/53 |
| 3,870,528 | 3/1975 | Edds et al. | 106/22 |
| 4,150,997 | 4/1979 | Hayes | 106/22 |
| 4,155,768 | 5/1979 | Adams et al. | 106/22 |

*Primary Examiner*—V. P. Hoke
*Attorney, Agent, or Firm*—Joseph G. Walsh

[57] ABSTRACT

Inks comprising crystal violet and the n-butyl ether of diethylene glycol exhibits great antimicrobial action and are particularly suited for use in ink jet printing.

3 Claims, No Drawings

INKS FOR INK JET PRINTING

DESCRIPTION

Technical Field

The present invention is concerned with inks which are particularly useful for printing using ink jet printers. The inks are aqueous solutions which comprise both crystal violet and the n-butyl ether of diethylene glycol.

BACKGROUND ART

Ink jet printing is becoming increasingly common in recent years and ink for such use has been the subject of a great deal of research.

Crystal violet has been known for many years. Its antimicrobial properties have also been known for many years. See for example, U.S. Pat. No. 1,893,997.

The n-butyl ether of diethylene glycol has also been known for many years. It is often called Butyl Carbitol. The prior art shows the material to be antimicrobial. See, for example, U.S. Pat. No. 3,291,580. The prior art also shows the use of ethers of diethylene glycol in ink. See for example, U.S. Pat. No. 2,083,372.

U.S. Pat. No. 2,755,202 mentions crystal violet (Col. 2, line 7 and Col 6, line 46), and it also mentions lower monoalkyl ethers of diethylene glycol (Col. 5 line 15). The patent, however, contains no disclosure of the combination of these ingredients, and makes no mention whatsoever of either ink jet printing or antimicrobial activity.

DISCLOSURE OF THE INVENTION

It has been found that a greatly improved ink for use in ink jet printing can be obtained when the ink comprises both crystal violet and the n-butyl ether of diethylene glycol in an aqueous solution. When the ink comprises both these ingredients, it exerts a very great antimicrobial activity and prevents fouling of the ink.

Ink jet printers pass ink through nozzles having diameters on the order of a thousandth of an inch. To assist in preventing particles from plugging the ink jet nozzles, micron-rated filters are also used in ink jet printers. Both the ink jet nozzles and the filters can become clogged with micro-biological organisms which can metabolize ink ingredients. The prevention of microbial growth from ink has been the subject of very great amounts of research. It has now been found that incorporating in the aqueous ink the combination of both crystal violet and the n-butyl ether of diethylene glycol inhibits the growth of micro-organisms, and thereby greatly improves the usefulness of the ink. In general, it is preferred that crystal violet be present in an amount of from about 0.10% to about 10% by weight, and that the n-butyl ether of diethylene glycol be present in an amount of from about 1% to about 20% by weight. Most preferred are concentrations of from about 0.5% to 2% for crystal violet, and about 4% to about 10% for the ether.

It is an additional advantage of the present invention that the inclusion of crystal violet also improves the ink's overall waterfastness to paper without increasing the particle content.

In addition to crystal violet and the n-butyl ether of diethylene glycol, the inks of the present invention may contain other additives when so desired. For example, additives known to the prior art may be used to regulate and control the viscosity, the surface tension, and the pH. Mixtures of dyes may also be used. It is an additional unexpected advantage of the present invention that, in the presence of n-butyl ether of diethylene glycol, crystal violet, which is a basic dye, may be used along with an acid dye. Prior to the present invention, it had not been thought possible to use a basic dye and an acid dye simultaneously in the same aqueous ink. It has now been found that the basic dye crystal violet may be used in the presence of an acid dye when the n-butyl ether of diethylene glycol is also present. Preferred acid dyes include Calcocid dyes, (Trademark of American Cyanimid Co.) particularly Calcocid Black-SR. The addition of such an acid dye gives the ink absorption in the near infra-red region. In general, from about 4% to about 8% by weight of the acid dye is preferred.

The antimicrobial properties of ink containing both crystal violet and the n-butyl ether of diethylene glycol were studied. A mix of bacterial organisms and mold organisms of the type that grow in ink was grown and stocked. Inoculated samples were incubated at 30° C. in water/shaker baths; stock organisms were stored in liquid nitrogen. Viable counts were taken by making serial dilutions of samples with 0.85% NaCl and plating on Difco nutrient agar plates. Colonies were counted after incubation for 48 hours at 30° C.

Instruments: pH measurements were made on a Radiometer/Copenhagen analytical water. Sterile Corning glass pipets were used for all dilutions and transfers. Colony counts were performed by hand on a New Brunswick Colony Counter. Calculations and statistical analyses were performed using the IBM APL/360 System.

Preliminary experiments, testing the biostatic effectiveness of crystal violet in a conventional nutrient broth plus 10% Carbowax 200, showed that the minimum inhibitory concentrations (MIC) are 0.0009% for mold and 0.008% for bacteria. These concentrations were sufficient to inhibit growth of a mixed inoculum for 7 days at 30° C.

Crystal violet was added to ink lacking antimicrobial ingredients. The levels tested were 0, 0.01%, 0.1% and 0.5% crystal violet. The 0 and 0.01% crystal violet samples show no biocidal effects after inoculation with $2 \times 10^5$ cfu/ml. Samples containing 0.1% and 0.5% crystal violet showed an initial drop in cell numbers, but viable counts increased to $2 \times 10^5$ cfu/ml after 14 days.

Higher levels of crystal violet in ink were evaluated. Samples containing 0.1% and 1.5% crystal violet and no butyl ether of diethylene glycol in ink showed an initial decrease in colony number, but again we observed a subsequent increase in viable cells. These samples were inoculated with $10^5$ cfu/ml. After 14 days at 30° C., viable bacteria had reached $10^6$ cfu/ml in the absence and presence of crystal violet. From the above data, we concluded that in this ink formulation, crystal violet was insufficient as an ink preservative.

We inoculated tubes containing ink with various levels of crystal violet or Butyl Carbitol, incubated 7 days and scored qualitatively for the presence of viable bacteria by spreading 0.1 ml from each tube onto nutrient agar. Neither 0.6% crystal violet nor 7% Butyl Carbitol was sufficient to eliminate viable bacteria. In contrast, 0.15% crystal violet plus 7% Butyl Carbitol was biocidal, and 0.6% crystal violet plus 4% Butyl Carbitol was also biocidal. The samples were re-inoculated every seven days for a total of 28 days, and scored for the presence of viable organisms every seven days. When 0.6% by weight crystal violet and 7% by weight Butyl Carbitol were both present, the effectiveness continued over the full 28 days. The data suggest a synergistic effect, since neither crystal violet nor Butyl Carbitol alone was effective.

I claim:

1. An ink for use in ink jet printing comprising an aqueous solution of both crystal violet and the n-butyl ether of diethylene glycol, wherein the crystal violet is present in the amount of from about 0.10% to about 10% by weight and the n-butyl ether of diethylene glycol is present in an amount of from about 1% to about 20% by weight.

2. An ink as claimed in claim 1 which also contains an acid dye.

3. An ink for use in ink jet printing comprising an aqueous solution of from about 0.5% to about 2% by weight of crystal violet, from about 4% to about 10% by weight of the n-butyl ether of diethylene glycol and from about 4% to about 8% of an acid black dye.

* * * * *